United States Patent
Wahl et al.

[11] Patent Number: 6,101,676
[45] Date of Patent: Aug. 15, 2000

[54] ADJUSTABLE CLUTCH HINGE ASSEMBLY FOR PORTABLE COMPUTER

[75] Inventors: Rick Wahl, Cedar Park; Andrew Moore, Austin, both of Tex.

[73] Assignee: Dell USA, L.P., Round Rock, Tex.

[21] Appl. No.: 09/014,370

[22] Filed: Jan. 27, 1998

[51] Int. Cl.⁷ .............................. E05C 17/64; E05D 11/08
[52] U.S. Cl. ................ 16/342; 16/340; 16/DIG. 42; 403/114; 403/120; 361/681
[58] Field of Search ............... 16/337, 338, 340, 16/342, DIG. 42; 361/681, 682; 403/112, 113, 120

[56] References Cited

U.S. PATENT DOCUMENTS

| | | |
|---|---|---|
| 2,698,958 | 1/1955 | Adams . |
| 3,910,627 | 10/1975 | Meyer ................................ 296/97.12 |
| 4,186,905 | 2/1980 | Brudy ................................. 248/478 X |
| 4,734,955 | 4/1988 | Connor ................................. 16/332 X |
| 5,018,244 | 5/1991 | Hino ......................................... 16/342 |
| 5,052,078 | 10/1991 | Hosoi ................................... 16/297 X |
| 5,075,929 | 12/1991 | Chung ..................................... 16/342 |
| 5,165,145 | 11/1992 | Sherman ............................... 16/341 X |
| 5,276,945 | 1/1994 | Matsumura ............................... 16/337 |
| 5,333,356 | 8/1994 | Katagiri ................................... 16/340 |
| 5,566,048 | 10/1996 | Esterberg et al. ..................... 361/681 |
| 5,598,607 | 2/1997 | Katagiri ................................... 16/337 |
| 5,632,066 | 5/1997 | Huong ................................. 16/338 X |
| 5,636,041 | 6/1997 | Pearce et al. ........................... 349/61 |
| 5,715,576 | 2/1998 | Liu ........................................... 16/342 |
| 5,752,293 | 5/1998 | Lowry et al. ............................. 16/342 |
| 5,765,263 | 6/1998 | Bolinas et al. ........................... 16/342 |
| 5,774,939 | 7/1998 | Lu ............................................ 16/342 |
| 5,832,566 | 10/1998 | Quek et al. ............................... 16/342 |
| 5,896,622 | 4/1999 | Lu ............................................ 16/342 |
| 5,950,281 | 9/1999 | Lu ............................................ 16/342 |

*Primary Examiner*—Terry Lee Melius
*Assistant Examiner*—John R. Cottingham
*Attorney, Agent, or Firm*—Haynes & Boone, L.L.P.

[57] ABSTRACT

The adjustable clutch hinge assembly includes a shaft, an adjustment member connected to one end of the shaft, a metal inner cone member, and a metal outer cone member. The end of the shaft to which the adjustment member is connected is inserted into an aperture in the inner cone member, which is split, to allow a decrease of the internal diameter thereof, and has protruding key features, such that a threaded portion of the adjustment member protrudes out the opposite end of the inner cone member. The inner cone member resides within the outer cone member, which has receptive features for the inner cone member and its protruding key features to prevent rotation of the inner cone member within the outer cone member. When the threaded portion of the adjustment member protruding out the end of the inner cone member is drawn through the outer cone member, an outer surface of the inner cone member is forced against an inner surface of the outer cone. This forces the inner diameter of the inner cone member to decrease, increasing the force on the shaft. The shallow pitch of the inner cone member allows relatively large displacements to produce small increases in force, making the torque applied to the shaft controllable.

25 Claims, 2 Drawing Sheets

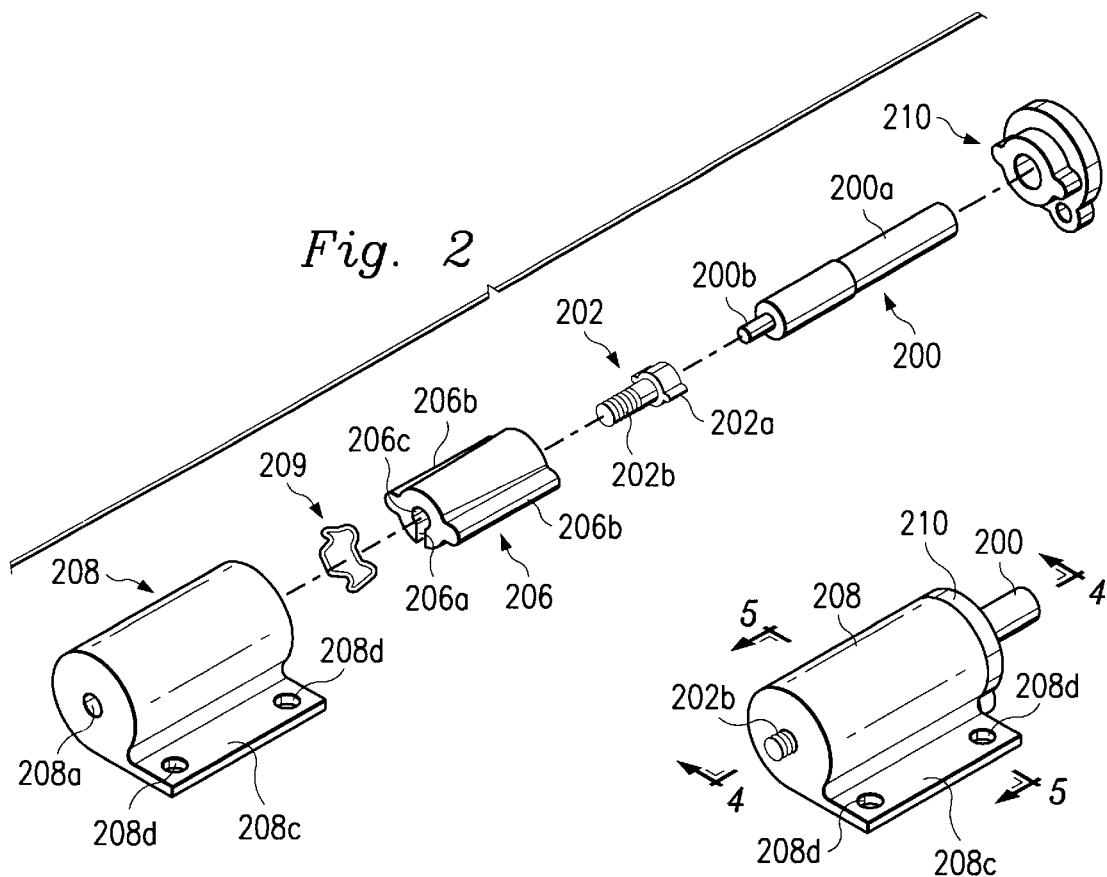
Fig. 2
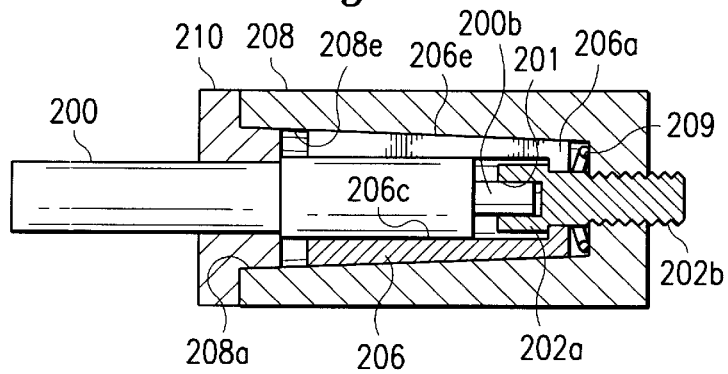
Fig. 3
Fig. 4
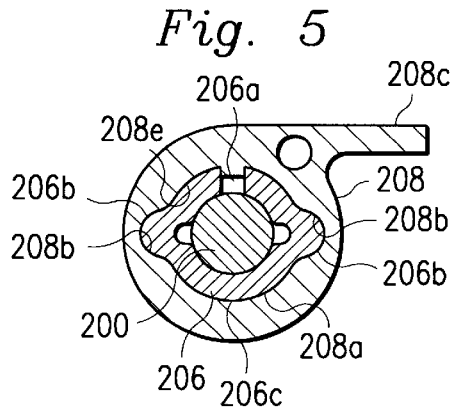
Fig. 5

ADJUSTABLE CLUTCH HINGE ASSEMBLY FOR PORTABLE COMPUTER

TECHNICAL FIELD

One embodiment relates generally to portable computers and, more particularly, to an adjustable clutch hinge assembly for connecting the display of a portable computer to the base thereof.

BACKGROUND

Conventional portable computers include a display housing rotatably connected to a base with a hinge assembly. The display housing is rotatable about the hinge assembly between an open position, in which the display, or "LCD," and a keyboard integrated into the base are exposed for use, and a closed position, in which the display housing functions as a cover for the base. Preferably, the hinge assembly is such that the display housing will be retained by the hinge assembly at nearly any angle selected by a user relative to the base.

In the past, this has been accomplished by relying on friction to hold the display housing at the selected angle. This technique suffers from several deficiencies. In particular, the friction necessary to support the weight of the display housing is often so great that both hands are required to open the computer and to pivot the display housing about the hinge. Moreover, hinge assemblies that rely on friction have a tendency to cause the display housing to slam against the base when the angular position of the display housing relative to the base reaches a certain minimum.

As an alternative, hinge assemblies have been provided with clutch mechanisms. One such clutch mechanism includes a friction component and a torsion spring component. The spring counteracts the weight of the display housing when the display housing is open, such that the friction component need only be strong enough to support the open display housing during times when the computer is subjected to vibration or the like. This solution reduces the amount of force necessary to adjust the angular position of the display housing and allows the use of a smaller, lighter friction component.

With the increasing modularity of computer systems, it is valuable to have components that can migrate across systems. Clutches have historically not been capable of use in more than one computer system because they are designed to resist a specific torque, and are therefore designed for a specific LCD configuration. For example, a clutch designed for use in a portable computer having a 13 inch LCD will likely be designed with less torque than one for use in a portable computer having a 15 inch LCD. Using a clutch with too much torque will result in many of the same difficulties associated with hinge assemblies that rely on friction, as described above. Alternatively, using a clutch with too little torque will result in the display housing's not being retained in the position selected by the user and either slamming shut, when the relative angle between the display housing and the base is less than 90 degrees, or falling back when the relative angle between the display housing and the base is greater than 90 degrees.

The fact that clutches are presently designed for use with a particular portable computer system is problematic for computer manufacturers that produce several different portable computer configurations. In particular, assembly of a computer using a hinge assembly with the wrong clutch (i.e., the wrong torque) will result in improper mechanical operation of the computer, depending on whether the torque is too great or too small, as described above. In addition, it is expensive to have to maintain an inventory of hinge assemblies for each of a variety of computers.

Therefore, what is needed is an adjustable torque clutch mechanism for incorporation into the hinge assembly of a portable computer.

SUMMARY

One embodiment, accordingly, is an adjustable clutch hinge assembly for portable computers. In a preferred embodiment, the adjustable clutch hinge assembly includes a shaft, an adjustment member connected to one end of the shaft, a metal inner cone member, and a metal outer cone member. The end of the shaft to which the adjustment member is connected is inserted into an aperture in the inner cone member, which is split, to allow a decrease of the internal diameter thereof, and has protruding key features, such that a threaded portion of the adjustment member protrudes out the opposite end of the inner cone member. The inner cone member resides within the outer cone member, which has receptive features for the inner cone member and its protruding key features to prevent rotation of the inner cone member within the outer cone member.

When the threaded portion of the adjustment member protruding out the end of the inner cone member is drawn through the outer cone member, an outer surface of the inner cone member is forced against an inner surface of the outer cone. This forces the inner diameter of the inner cone member to decrease, increasing the force on the shaft. The shallow pitch of the inner cone member allows relatively large lateral displacements to produce small increases in force, making the torque applied to the shaft controllable. Using a torque wrench with different settings will enable customization of the torque on the assembly line.

Additionally, attachment of a knob or thumbscrew to the protruding threaded portion enables the torque to be user adjustable as described above.

Insertion of a wave washer of sufficient force between the inner and outer cone members and encircling the threaded portion will prevent friction from locking the cone members together during torque adjustment.

A technical advantage achieved is that a single clutch design can be used in multiple systems, regardless of the configuration of the LCD, so long as the clutch torque is appropriately adjusted on the assembly line.

Another technical advantage achieved is that it enables users to adjust the torque of the clutch.

BRIEF DESCRIPTION OF THE DRAWINGS

FIG. 2 is an exploded view of a hinge assembly embodying features of a preferred embodiment.

FIG. 3 is a perspective view of the hinge assembly of FIG. 2.

FIG. 4 is a cross-sectional view of the hinge assembly of FIG. 3 along a line 4—4.

FIG. 5 is a cross-sectional view of the hinge assembly of FIG. 2 along the line 5—5.

DESCRIPTION OF THE PREFERRED EMBODIMENT

Figure 1:
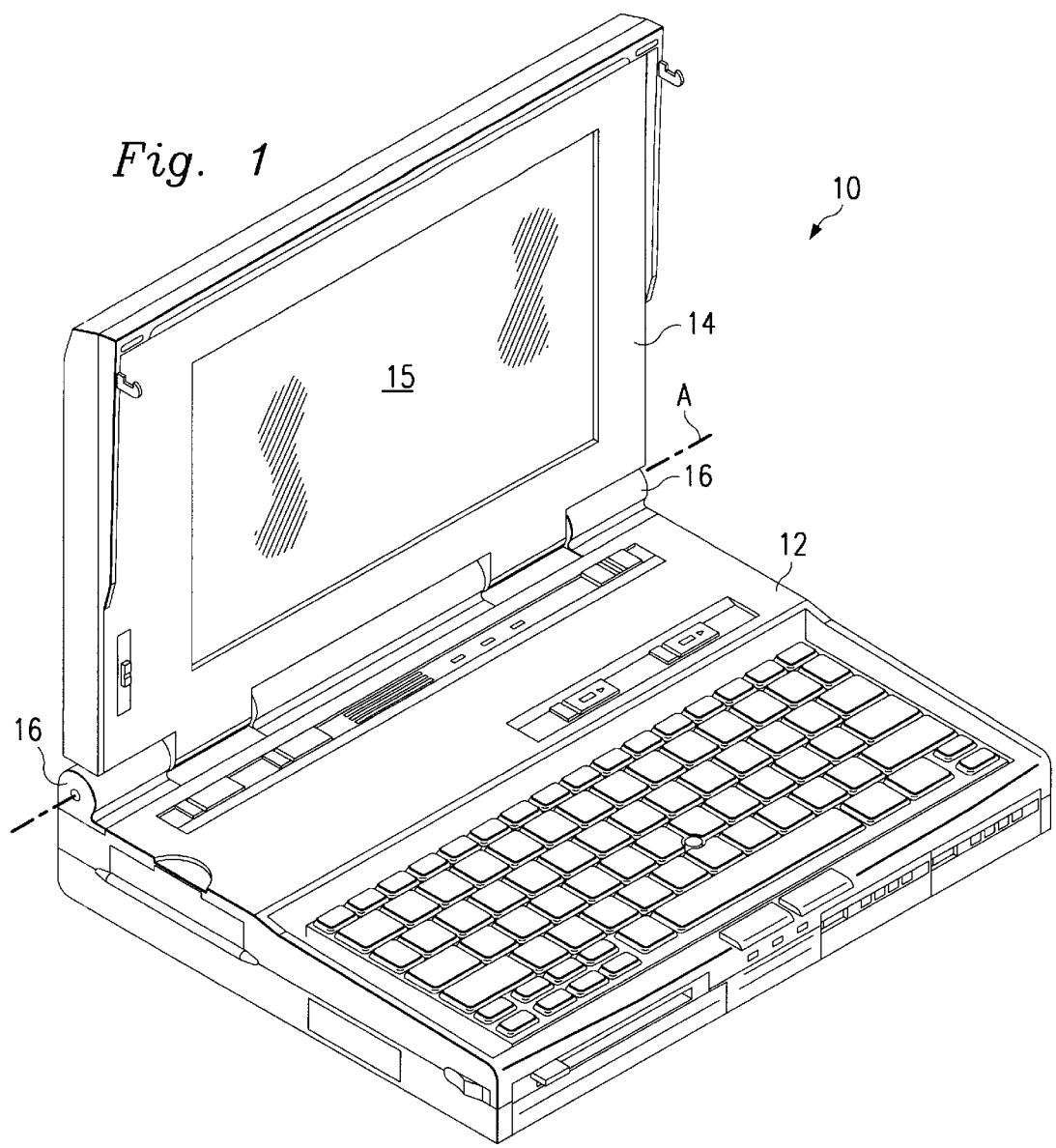
FIG. 1 is a perspective view of a portable computer embodying features of a preferred embodiment.

Referring to FIG. 1, a portable computer 10 includes a base 12 and a display housing 14 including an LCD 15 and connected to the base 12 via hinge assemblies 16 such that the display housing 14 is rotatable with respect to the base 12 about a pivot axis A.

The hinge assembly 16 will now be described in further detail with reference to FIGS. 2, 3, and 4. In particular, the hinge assembly includes a shaft 200 (FIG. 2) having first and second ends, respectively designated by reference numerals 200a and 200b. The second end 200b has a smaller circumference than the remainder of the shaft 200 for insertion into and retention within a circular aperture 201 (FIG. 4) in a head portion 202a of an adjustment member 202. The adjustment member 202 further includes a threaded portion 202b for purposes that will be described in detail below.

An inner cone member 206 includes a slot 206a disposed along the length thereof, enabling expansion and contraction of the diameter of the inner cone member 206, and key features 206b disposed on opposite sides of the inner cone member 206. As best shown in FIG. 4, the inner cone member 206 includes a circular aperture 206c extending lengthwise therethrough designed to receive therein the adjustment member 202 and shaft 200 such that the threaded portion 202b protrudes from an end 206d of the inner cone member 206. As also best shown in FIG. 4, the inner cone member 206 is disposed within an outer cone member 208, which has an aperture 208a extending the length thereof for receiving the inner cone member 206. As shown in FIG. 5, which is a cross-sectional view of the outer cone member 208, the aperture 208a includes slots 208b extending the length of the aperture 208a for accommodating the key features 206b of the inner cone member 206. Cooperation of the key features 206b with the slots 208b prevents rotation of the inner cone member 206 within the outer cone member 208.

A wave washer 209 disposed between the inner cone member 206 and the outer cone member 208 and encircling the threaded portion 202b prevents friction from locking the cone members together during adjustment of the torque of the hinge assembly 16.

Figure 6:
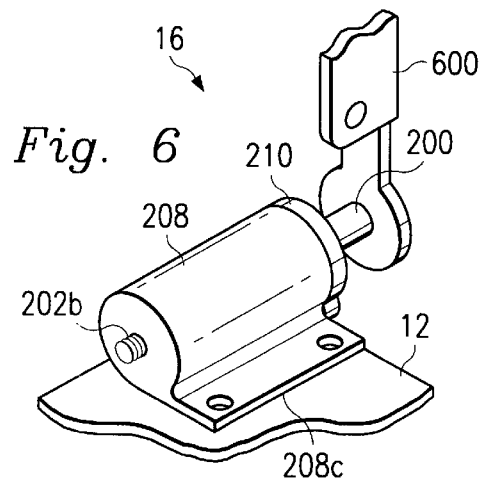
FIG. 6 illustrates connection of the hinge assembly of FIG. 2 to the portable computer of FIG. 1.

An end cap 210 is provided proximate the first end 200a of the shaft 200 and secured to the end of the outer cone member 208 opposite the end from which the threaded portion 202b protrudes for finishing the assembly 16. As shown in FIG. 6, in a preferred embodiment, the shaft 200 is connected in a known manner to a metal frame 600 of the display housing 14. Additionally, the outer cone member 208 includes a flange 208c having two threaded apertures 208d for securing the outer cone member 208 to the base 12. Alternatively, it will be recognized that the shaft 200 may be connected to the base 12 and the outer cone member 208 to the metal frame 600.

In operation, when the threaded portion 202b of the adjustment member 202 protruding out the end of the inner cone member 206 is drawn through the outer cone member 208, an outer surface 206e of the inner cone member is forced against an inner surface 208e of aperture 208a of the outer cone member 208. This forces the inner diameter of the inner cone member 206 to decrease, increasing the force on the shaft 200. The shallow pitch of the inner cone member 206 allows relatively large lateral displacements to produce small increases in force, making the torque applied to the shaft 200 controllable. Using a torque wrench with different settings will enable customization of the torque on an assembly line.

Figure 7:
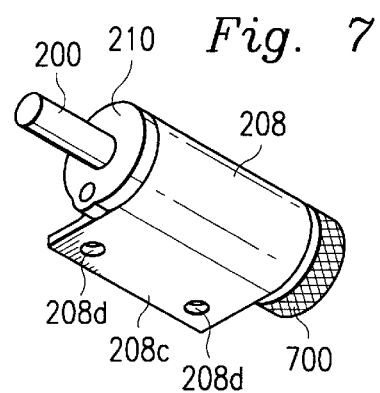
FIG. 7 is a perspective view of a hinge assembly according to an alternative embodiment.

Additionally, as shown in FIG. 7, attachment of a knob or thumbscrew 700 to the protruding threaded portion enables the torque to be user adjustable as described above.

Although an illustrative embodiment has been shown and described, other modifications, changes, and substitutions are intended in the foregoing disclosure. Accordingly, it is appropriate that the appended claims be construed broadly and in a manner consistent with the scope of the disclosure.

What is claimed is:

1. An apparatus for mounting two components for relative rotational movement, the apparatus comprising:

a housing connected to one of the components, a shaft connected to the other component and disposed in the housing, a sleeve disposed between the shaft and the housing in frictional engagement therewith, thus preventing rotation between the housing and the shaft, and therefore between the components in the absence of a predetermined torque applied to one of the components, and means for varying the frictional engagement and the amount of the predetermined torque, wherein the housing has a conical inner surface, and the sleeve has a conical outer surface and an axial slot; and wherein the varying means comprises means for moving the sleeve axially relative to the housing, wherein the sleeve is compressed between the housing and the shaft, and wherein the axial movement of the sleeve varies the compression and therefore the frictional engagement with the shaft.

2. A hinge assembly having means for adjusting the torque thereof, the hinge assembly comprising:

an outer cylinder having an inner conical shape;

an inner cylinder having an outer conical shape, said inner cylinder disposed within the outer cylinder;

means for preventing rotational movement of said inner cylinder with respect to said outer cylinder while permitting lateral movement of said inner cylinder with respect to said outer cylinder;

means for enabling a diameter of said inner cylinder to be changed responsive to force applied to an outer surface of said inner cylinder;

a shaft inserted through said inner cylinder disposed within said outer cylinder; and means for converting rotational force applied the shaft to lateral force applied to said inner cylinder.

3. The hinge assembly of claim 2 further comprising a thumbscrew attached to said means for converting for applying rotational force to said means for converting.

4. The hinge assembly of claim 2 further comprising an end cap connected to one end of said outer cylinder.

5. The hinge assembly of claim 2 wherein said outer cylinder comprises a flange including at least one threaded aperture therethrough for attaching said flange to said base using a screw.

6. The hinge assembly of claim 2 further comprising a wave washer disposed within said outer cylinder and encircling a portion of said means for converting.

7. A hinge assembly comprising:

a shaft having first and second ends;

an adjustment member connected at a first end thereof to said first end of said shaft and a second end comprising a threaded portion;

an inner cylinder having an outer conical shape and a circular aperture extending lengthwise therethrough and having an inner surface and an outer surface, said inner cylinder further comprising:

a lengthwise slot extending through said inner cylinder from said outer surface to said inner surface; and two protruding key features extending lengthwise on said outer surface of said inner cylinder opposite one another; and an outer cylinder having an inner conical shape and a circular aperture extending lengthwise therethrough and having an inner surface and an outer surface, said outer cylinder further comprising key feature receptacles extending lengthwise on said inner surface of said outer cylinder, said key feature receptacles positioned to retain said key features therein when said inner cone is inserted into said outer cone;

wherein said shaft is retained within said inner cylinder and said inner cylinder is retained within said outer cylinder such that said threaded portion of said adjustment member protrudes from a first end of said outer cylinder.

8. The hinge assembly of claim 7 further comprising an end cap connected to a second end of said outer cylinder.

9. The hinge assembly of claim 7 further comprising a thumbscrew attached to said threaded portion of said adjustment member.

10. The hinge assembly of claim 7 further comprising means for connecting said hinge assembly to a base of a portable computer.

11. The hinge assembly of claim 10 wherein said means for connecting said hinge assembly to a base of a portable computer comprises a flange connected to said outer cylinder, said flange including at least one threaded aperture therethrough for attaching said flange to said base using a screw.

12. The hinge assembly of claim 7 further comprising a wave washer disposed within said outer cylinder and encircling said threaded portion.

13. A hinge assembly comprising:
a shaft having first and second ends;
an adjustment member connected at a first end thereof to said first end of said shaft and a second end comprising a threaded portion;
an inner cylinder having an outer conical shape and a circular aperture extending lengthwise therethrough and having an inner surface and an outer surface, said inner cylinder further comprising:
a lengthwise slot extending through said inner cylinder from said outer surface to said inner surface; and
two protruding key features disposed on said outer surface of said inner cylinder opposite one another and extending the length of the inner cylinder; and
an outer cylinder having an inner conical shape and a circular aperture extending lengthwise therethrough and having an inner surface and an outer surface, said outer cylinder further comprising key feature receptacles disposed on said inner surface of said outer cylinder and extending substantially the length of the outer cylinder, said key feature receptacles positioned to retain said key features therein when said inner cone is inserted into said outer cone; and
an end cap;
wherein said shaft is retained within said inner cylinder and said inner cylinder is retained within said outer cylinder such that said threaded portion of said adjustment member protrudes from a first end of said outer cylinder and said end cap is connected to a second end of said outer cylinder.

14. The hinge assembly of claim 13 further comprising a thumbscrew attached to said threaded portion of said adjustment member.

15. The hinge assembly of claim 13 further comprising means for connecting said hinge assembly to a base of a portable computer.

16. The hinge assembly of claim 15 wherein said means for connecting said hinge assembly to a base of a portable computer comprises a flange connected to said outer cylinder, said flange including at least one threaded aperture therethrough for attaching said flange to said base using a screw.

17. The hinge assembly of claim 13 further comprising a wave washer disposed within said outer cylinder and encircling said threaded portion.

18. A portable computer comprising:
a base;
a display housing; and
a hinge assembly for rotatably connecting said display housing to said base, the hinge assembly comprising:
a shaft having first and second ends;
an adjustment member connected at a first end thereof to said first end of said shaft and a second end comprising a threaded portion;
an inner cylinder having an outer conical shape and a circular aperture extending lengthwise therethrough and having an inner surface and an outer surface, said inner cylinder further comprising:
a lengthwise slot extending through said inner cylinder from said outer surface to said inner surface; and
two protruding key features extending lengthwise on said outer surface of said inner cylinder opposite one another; and
an outer cylinder having an inner conical shape and a circular aperture extending lengthwise therethrough and having an inner surface and an outer surface, said outer cylinder further comprising key feature receptacles extending lengthwise on said inner surface of said outer cylinder, said key feature receptacles positioned to retain said key features therein when said inner cone is inserted into said outer cone, said outer cylinder further comprising a flange having threaded apertures therethrough;
wherein said shaft is retained within said inner cylinder and said inner cylinder is retained within said outer cylinder such that said threaded portion of said adjustment member protrudes from a first end of said outer cylinder; and
wherein said hinge assembly is connected to said base using screws through said threaded apertures in said flange and said hinge assembly is connected to said display housing by connecting said shaft to a display frame of said display housing.

19. The portable computer of claim 18 wherein said hinge assembly further comprises an end cap connected to a second end of said outer cylinder.

20. The portable computer of claim 18 wherein said hinge assembly further comprises a thumbscrew attached to said threaded portion of said adjustment member.

21. The portable computer of claim 18 further comprising a wave washer disposed within said outer cylinder and encircling said threaded portion.

22. A method of adjusting a torque of a hinge assembly comprising an outer cylinder, a slotted inner cylinder disposed within said outer cylinder in a keyed manner so as to permit lateral movement of said inner cylinder with respect to said outer cylinder and to prevent rotational movement of said inner cylinder with respect to said outer cylinder, and a shaft inserted through said inner cylinder within said outer cylinder such that a threaded end portion of an adjustment member connected to an end of said shaft protrudes out a first end of said outer cylinder, the method comprising:

applying a rotational force to said adjustment member to cause lateral movement of said inner cylinder thereby to adjust said hinge assembly torque to a preselected value.

23. The method of claim 22 wherein said applying a rotational force to said adjustment member is performed with a torque wrench set to said preselected value.

24. The method of claim 22 further comprising providing a thumbscrew on said threaded end portion, wherein said applying a rotational force to said adjustment member is performed using said thumbscrew.

25. The method of claim 22 further comprising providing a wave washer disposed within said outer cylinder and encircling said threaded end portion.

* * * * *